July 10, 1956   J. I. MITCHELL   2,753,736
HAND AND POWER OPERATED GEARING
Filed Oct. 31, 1951   2 Sheets-Sheet 1
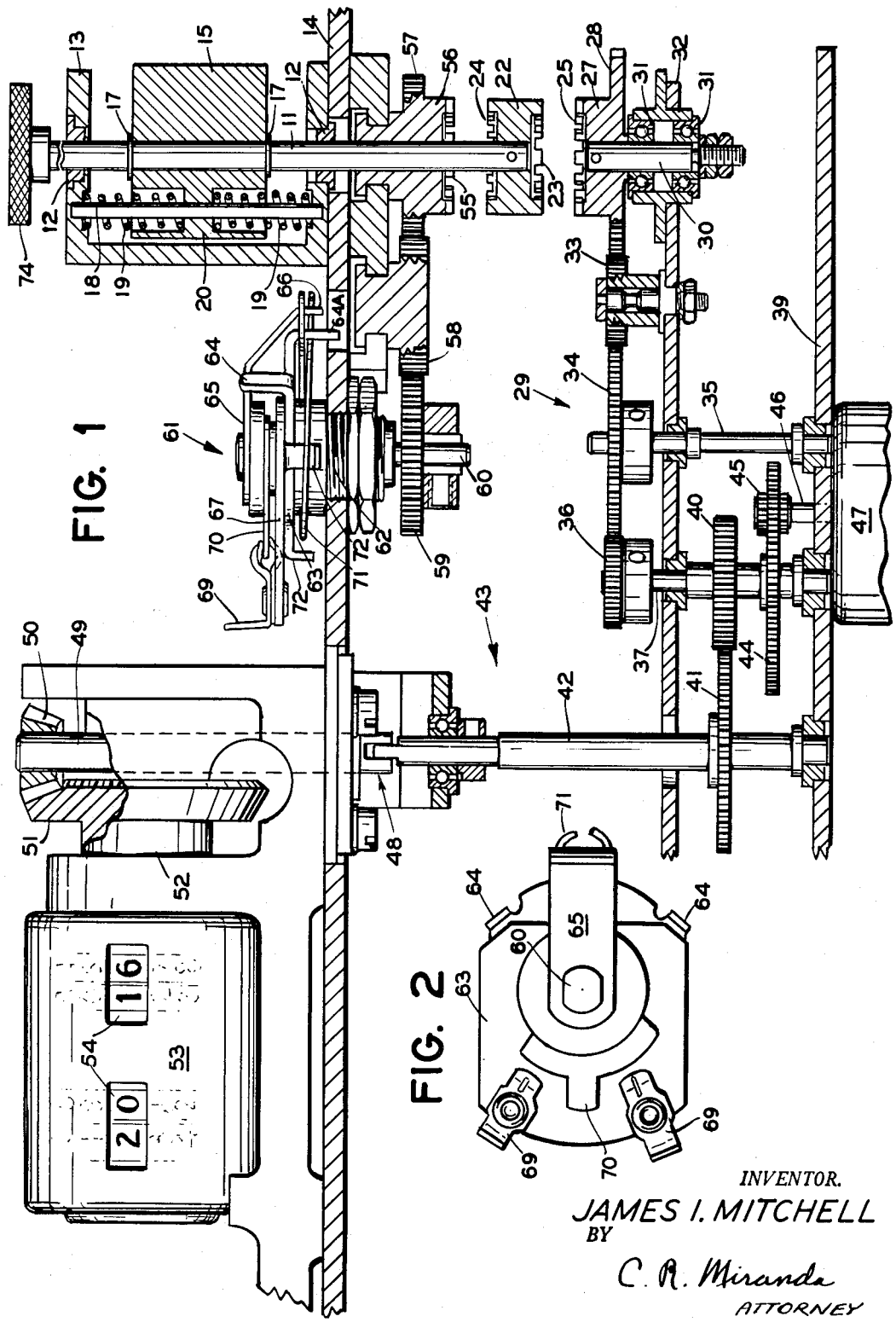
INVENTOR.
JAMES I. MITCHELL
BY
C. R. Miranda
ATTORNEY

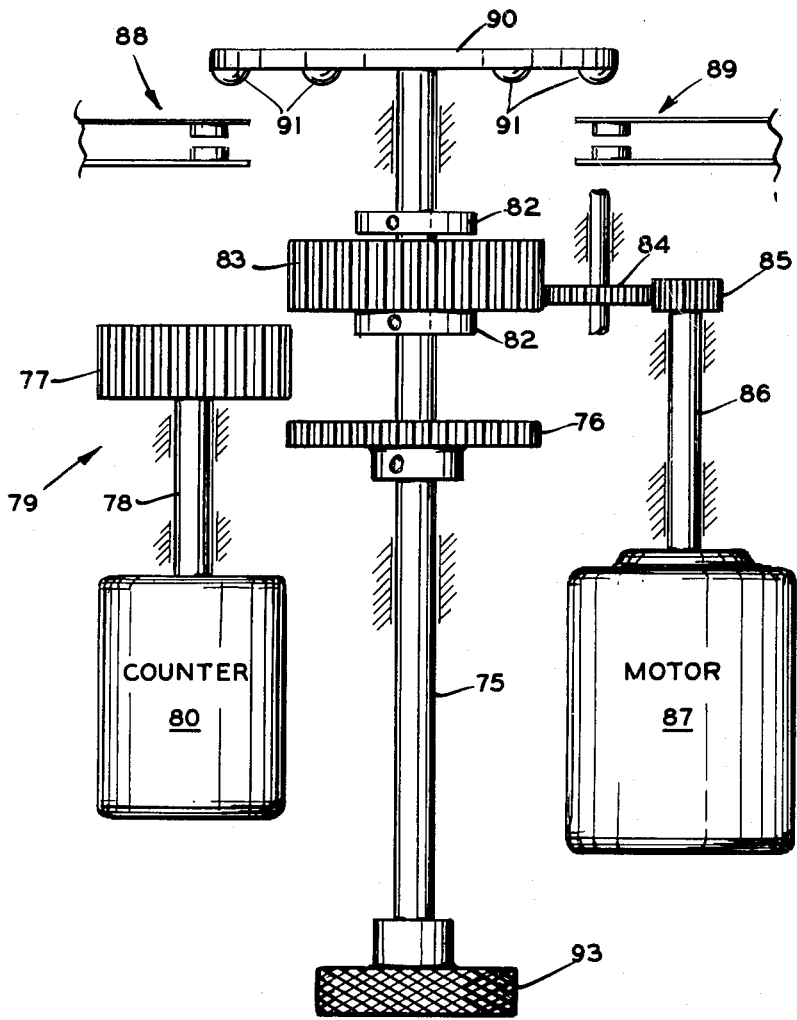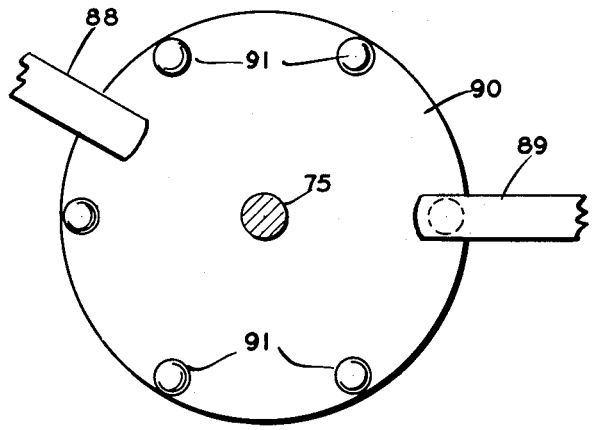

United States Patent Office 2,753,736
Patented July 10, 1956

2,753,736

HAND AND POWER OPERATED GEARING

James I. Mitchell, River Edge, N. J., assignor to Bendix Aviation Corporation, Teterboro, N. J., a corporation of Delaware Application October 31, 1951, Serial No. 254,173

3 Claims. (Cl. 74—625)

This invention generally relates to indicating instruments and more particularly to selectively operable means for preselecting the indications of such instruments.

Heretofore, many of the arrangements for driving or positioning indicators have included manual drives wherein the indicators were driven directly by hand and, in other cases, by a motor instead of by hand. In still other arrangements, manual and motor drives were combined to position the indicators but each drive was operable from a separate or individual control. Usually, the last mentioned arrangement embodied an indicator which was driven by a manually operable device through an interconnecting gear train, and an electric motor was connected for driving the indicator through the same or different gear train, the motor being set in operation by a manually operable switch.

The present invention contemplates novel control means for selectively instituting manual or motor operation of the driving mechanism of an indicator. The control means comprises an axially movable and rotatable control shaft which when moved to one position permits manual operation of the driving mechanism and when moved to another position permits operation of the driving mechanism by a motor. In one embodiment of the invention, a gear is fastened to one end of the control shaft and when the latter is in an "out" position, angular displacement thereof actuates a switch which connects a motor to a power source to drive the indicator. When the shaft is pushed into an "in" position, the gear meshes with an input gear of a gear train connected for driving the indicator, whereby the driving mechanism may be operated manually. In a second embodiment of the invention, a gear loosely mounted on the control shaft is adapted to interconect a motor and the indicator when the shaft is in an "out" position. Fixed to one end of the shaft is a cam wheel which has several cam lobes thereon adapted to contact a plurality of switches for connecting power to the motor whereby the motor drives the indicator when the shaft is pulled out and angularly displaced. A second gear fastened to the shaft and intermediate the ends thereof provides for manual driving of the indicator when the shaft is pushed inwardly and rotated. In each embodiment, a common control member effects setting of an indicator to any desired indication either through a manual drive or a motor drive.

An object of the present invention, therefore, is to provide novel control means which permits setting of an indicator to a desired indication by either manually rotating the driving mechanism or by rotating the driving mechanism by a motor.

Another object is to provide a novel arrangement comprising a common actuating member for effecting either manual or motor setting of an indicating instrument.

Still another object is to provide a novel arrangement including a control member which when axially moved to one of two positions and angularly displaced effects driving of an indicator through a manual drive or a motor drive.

The above and other objects and advantages of the present invention will appear more fully hereinafter from a consideration of the detailed description which follows, taken together with the accompanying drawings wherein two embodiments of the invention are illustrated.

In the drawings wherein like reference characters refer to like parts throughout the several views:

Fig. 1 is a detailed schematic illustration of one embodiment of the present invention;

Fig. 2 is a top plan view of the switch shown in Fig. 1;

Fig. 3 is a diagrammatic illustration of a second embodiment of the present invention; and Fig. 4 is a diagrammatic illustration of the front of the cam and the switches of Fig. 3.

Referring now to the drawings for a more detailed description of the present invention and more particularly to Fig. 1 wherein one embodiment hereof is clearly illustrated, a manually operable control member or shaft 11 is suitably journalled for axial and rotary movements in a pair of bearings 12 retained in a U-shaped supporting bracket 13 secured to a wall 14. A collar 15 is loosely mounted on shaft 11 by means of rings 17 fitted in slots cut in the shaft which permit the collar to move with the shaft in an axial direction. Collar 15 is restrained from moving with angular displacements of shaft 11 by a pin 18 which passes through an opening formed in the collar and is supported at each end in bracket 13. Located on pin 18 are a pair of centering springs 19 which have opposite ends bearing against the walls of the bracket and their adjacent ends abutting against opposite sides of a wall 20 formed in collar 15. By reason of the foregoing structure, shaft 11 is urged by spring 19 to an intermediate or ineffective position for a purpose to be set forth hereinafter.

Shaft 11 extends through wall 14 and has pinned to its inner end a jaw clutch element 22 having opposite ends formed with toothed portions or gears 23 and 24. Gear 23 is adapted for meshing engagement with a toothed portion or gear 25 formed on the reduced portion 27 of a member which has a second toothed portion or gear 28 formed on an increased diameter portion thereof. Member 27 comprises part of and the input member of a motion transmitting means or a gear train generally designated by numeral 29, and is fixed to a relatively small shaft 30 supported for rotation in bearings 31 retained in a second wall 32. Gear 28 meshes with an idler 33 which in turn engages a relatively large gear 34 pinned to a shaft 35. Motion of shaft 35 is transmitted to a pinion 36 in mesh with gear 34, the pinion being mounted on a shaft 37 supported at one end in wall 32 and at its other end in a wall 39. Shaft 37 has a second pinion 40 mounted thereon which meshes with a gear 41 secured to a shaft 42 forming part of the counter driving mechanism 43.

Shaft 37 adjacent wall 39 has a relatively large gear 44 mounted thereon which meshes with a pinion 45 formed on the shaft 46 of a reversible motor 47. The purpose of motor 47 will be explained hereinafter.

One end of shaft 42 forms part of a tongue-slot connection 48 for transmitting motion thereof to a shaft 49 having a slot formed at an adjacent end. The opposite end of shaft 49 accommodates a bevel gear 50 which meshes with a companion bevel gear 51 formed on an indicator shaft 52 of a conventional counter type indicator 53 having counter wheels 54. Shafts 42, 49 and 52, and bevel gears 50 and 51 comprise the driving mechanism 43 for indicator 53.

Gear 24 of jaw clutch element 22 is adapted for meshing engagement with a toothed portion or gear 55 formed on a member 56 which has a relatively large gear 57 formed on an increased diameter portion thereof. Gear 57 is in mesh with an idler gear 58 which in turn drives a gear 59 mounted on a movable shaft 60 of a switch 61. Secured to a bushing 62, which partially surrounds shaft 60, is a plate 63 having a pair of upwardly extending stops 64 and a finger 64A projecting into an opening formed in wall 14. A stop arm 65 is fixedly mounted on shaft 60 and is adapted for engaging stops 64 so as to limit the travel of shaft 60. Located above plate 63 is an insulating plate 67 which has secured thereto two terminal contacts 69 (Fig. 2), the ends of the contacts adjacent shaft 60 each comprising two fingers bent towards each other for clamping therebetween a contact 70 fastened to the shaft. Switch 61 has a spring 71 retained thereon by projections 72 of plate 63 which is wrapped around bushing 62. The ends of spring 71 engage a downwardly projecting portion 66 of stop arm 65 to normally bias the shaft to a position wherein contact 70 lies midway between terminal contacts 69. A conductor (not shown) is connected to each terminal contact 69 to connect motor 47 to a power source (not shown). Movement of shaft 60 so as to bring contact 70 into engagement with one or the other of terminals 69 will effect operation of the motor in one direction or another according to the terminal engaged.

Considering the operation of the arrangement described, if it is desired to institute manual operation of the driving mechanism 43 in order to set the indicator to a desired indication, knob 74 on control shaft 11 is pushed inwardly and angularly displaced. Gear 23 will mesh with gear 25 so that rotation of shaft 11 will effect rotation of shaft 42 through gear train 29 to drive counter wheels 54. Shaft 11 is rotated until the desired indication is obtained on the indicator. When knob 74 is released shaft 11 will be urged back to its ineffective or intermediate position by springs 19 and gear 23 will disengage gear 25. To institute a motor drive for operating driving mechanism 43, knob 74 is pulled outwardly so that gear 24 engages gear 55 and then is rotated. Rotation of gear 55 will effect turning of gears 57, 58 and 59 to angularly displace shaft 60 against spring 71 and bring contact 70 into engagement with one or the other of end terminals 69 according to the direction of rotation of the shaft 11. In this manner, motor 47 is energized and shaft 46 rotates to drive shaft 37 and shaft 42 of driving mechanism 43 through gears 40 and 41. As long as shaft 11 is held outwardly and angularly displaced, motor 47 will be energized to drive counter wheels 54 and when the desired indication has been reached shaft 11 is released thereby disengaging gears 24 and 55 so as to allow shaft 60 and contact 70 to be returned to an off or middle position by the return spring 71. It is apparent that stops 64 and stop arm 65 prevent contact 70 from moving off of plate 63 and rotation of shaft 11 beyond the point where the stop arm engages the stops is prevented.

A second embodiment of the present invention is schematically illustrated in Figs. 3 and 4 wherein a manually operable control member or shaft 75 is shown as having a gear 76 fixed thereto. Shaft 75 is movable axially and adapted for rotary movement, as is shaft 11 in the first embodiment of the invention, and inward movement of the shaft from the position shown in Fig. 3 brings gear 76 into mesh with a gear 77 mounted on a counter shaft 78 both of which comprise the driving mechanism 79 of an indicator 80 shown in block form. Mounted on control shaft 75 and restrained from axial movement relative thereto by a pair of collars 82 is a gear 83 which is free to rotate on the shaft. Gear 83 is in constant meshing engagement with an idler gear 84 which is adapted for turning by a pinion 85 formed on shaft 86 of a reversible motor 87.

A pair of switches 88 and 89, each comprising a pair of electrical contacts, serve to connect motor 87 to a source of power (not shown) and depending upon the switch actuated, motor shaft 86 will be driven in one direction or the other. The means for actuating switches 88 and 89 consists of a circular plate 90 mounted at one end of shaft 75 and the plate carries cam lobes 91 on one face thereof (Fig. 4). When control shaft 75 is in the position shown in Fig. 3 switches 88 and 89 are out of contact with cam lobes 91 and therefore, are in an "open" condition. However, if knob 93 on shaft 75 is pulled outwardly and angularly displaced, switches 88 and 89 will be in the path of movement of the cam lobes 91 and as a result one or the other of the switches will be actuated. As seen in Fig. 4, the cam lobes are arranged on plate 90 so that only one switch may be actuated at any instant; the number of lobes shown are six but two or even one may be used, the main consideration being the amount of angular displacement of shaft 75 desired before actuating the switches. In the present showing, six lobes are used to provide for small angular displacements of the plate before one of the switches is actuated.

Considering the operation of the foregoing arrangement, manual driving of indicator 80 is accomplished by pushing knob 93 inwardly and rotating the same, whereby gear 76 will engage gear 77 to drive indicator 80. To institute a motor drive of indicator 80, knob 93 is pulled outwardly and rotated whereby gear 83 meshes with gear 77 and one of cam lobes 91 will actuate one of the switches and cause motor 87 to rotate. The motion of pinion 85 on shaft 86 will be transmitted to intermediate gear 84, to gear 83 and finally to gear 77 on counter shaft 78 to change the indication of indicator 80. It is to be understood that spring means (not shown), which may be similar to centering springs 19 of Fig. 1, are used to return control shaft 75 to an ineffective position after knob 93 is released.

From the foregoing, it is apparent that the two embodiments of the present invention provide novel means for selectively instituting manual and motor drives for the driving mechanism of an indicator by a single control member.

Although two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a control device for selectively applying either manual or motor power to drive a shaft member, including a motor geared to drive the shaft and switch means for effecting energization of the motor: a gear train for operating the switch means, having in a gear thereof an axially disposed driven clutch jaw; a second gear train to directly drive the shaft member, having in a gear thereof an axially disposed driven clutch jaw positioned in opposed spaced relation to the first mentioned driven clutch jaw; a driving clutch member having a neutral position between the two clutch jaws and in spaced relation to each of the jaws, and having in one end face thereof a driving jaw engageable with one of the driven clutch jaws, and having in the opposite face a driving jaw engageable with the other driven clutch jaw; an elongated rod carrying the driving clutch member at an end thereof, and extending axially from one face of the driving clutch member freely through one of the driven clutch jaw members; and means supporting the rod, enabling manual longitudinal movement of the rod to engage a jaw of the driving clutch member with one driven clutch jaw when the rod is moved longitudinally in one direction, and to engage the other jaw of the driving clutch member with the other driven clutch jaw when the rod is moved longitudinally in the opposite direction, and enabling manual rotation of the rod and associated driving clutch member to effect rotation of the particular driven clutch jaw with which the driving clutch member has been engaged; and spring tensioned means continuously urging opposed balancing forces upon the rod, whereby the associated driving clutch member is normally held in its neutral position.

2. In control mechanism of the character described for effecting the operation of either one or the other of a pair of gear trains: a first driven clutch member supported for rotatable movement and having a gear portion engaged for driving one of the gear trains; a second driven clutch member having a gear portion engaged for driving the other gear train and rotatably supported in opposed spaced relation to the first driven clutch member; a bracket support having a pair of opposed end walls; a pin member fixed at its ends in the opposed end walls; a block member longitudinally slidable on the pin member between the walls; a pair of springs bearing against opposed faces of the block member and holding the block in a balanced position on the pin and in spaced relation to each of the end walls; a rotatable control rod projecting freely through the end walls and block member, an end of the control rod extending freely through an axial hole in the first driven clutch member and projecting into the space separating the opposed driven clutch members; a driving clutch member carried at the said end of the control rod in spaced relation to each of the said clutch members and having a driving clutch face engageable with the first driven clutch member and an opposed driving clutch face engageable with the second driven clutch member; a pair of collars carried on the control rod restraining the control rod against longitudinal movement in the block member; and a knob fixed to the opposite projecting end of the control rod for manually lifting the control rod and the associated block member in one direction against the tension of one of the springs so as to bring one driving clutch face into engagement with the first driven clutch member to enable actuation of the associated gear train upon rotation of the control rod, and the knob further serving for manually depressing the control rod and the associated block member in the opposite direction against the tension of the other spring so as to bring the other driving clutch face into engagement with the second driven clutch member to enable actuation of the associated gear train upon rotation of the control rod.

3. Control mechanism as set forth in claim 2 characerized by a pair of gear trains, one associated with each driven clutch member, wherein switch means is operatively associated with one of the gear trains for effecting operation of a motorized drive shaft, and the other of the gear trains is directly engaged for operating the drive shaft.

References Cited in the file of this patent
UNITED STATES PATENTS

| | | |
|---|---|---|
| 901,456 | Loitron | Oct. 20, 1908 |
| 1,483,489 | Sperry | Feb. 12, 1924 |
| 2,255,739 | Curtis | Sept. 9, 1941 |